June 19, 1956 C. SKLAREK 2,750,840
VIBRATION DAMPED MIRRORS
Filed Dec. 28, 1953
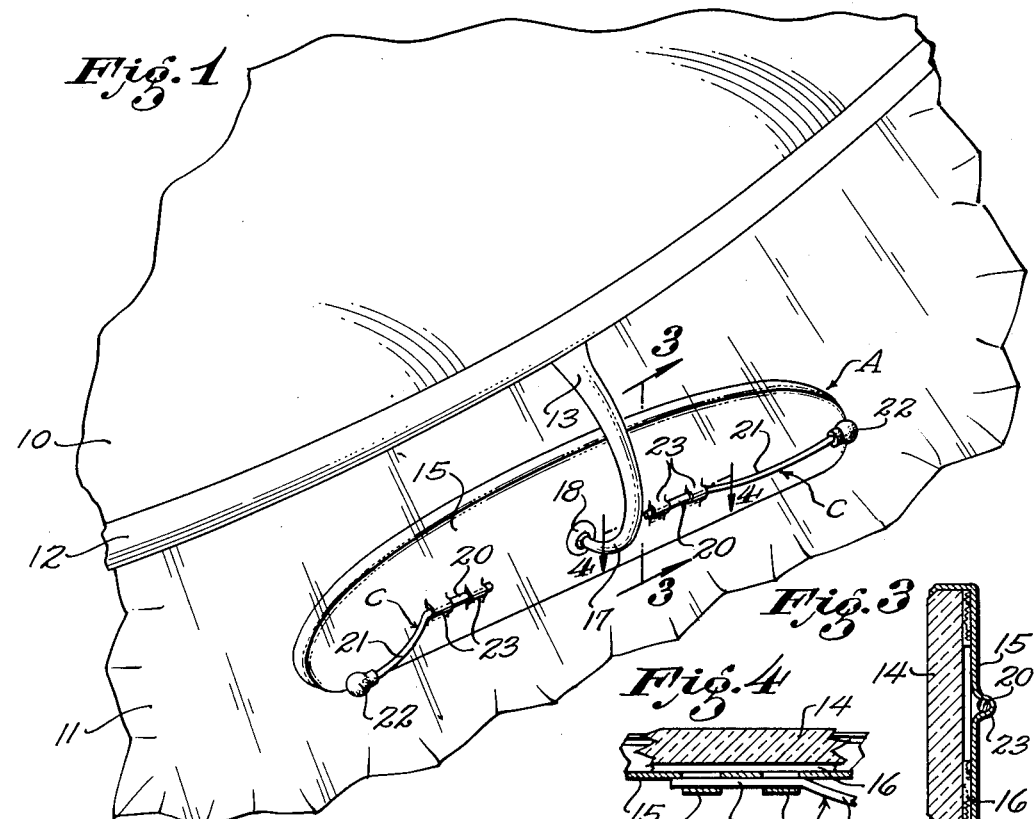
INVENTOR,
CLIFFORD SKLAREK
By Joseph Harris
his ATTORNEY.

United States Patent Office 2,750,840
Patented June 19, 1956

2,750,840

VIBRATION DAMPED MIRRORS

Clifford Sklarek, Los Angeles, Calif.

Application December 28, 1953, Serial No. 400,515

3 Claims. (Cl. 88—98)

This invention relates to vibration damped mirrors and, more especially, rear vision mirrors commonly employed on automotive vehicles subject to swaying, bouncing and jolting when in motion.

One of the most notable safety improvements in automotive vehicles in recent years, is that of providing a wider range of vision for the operator, particularly through the rear window of the vehicle by radically increasing the width of such window. To a rather limited extent, there has been some effort to increase correspondingly the width of the field of vision of the usual rear vision mirror so as to obtain the full benefit of the wider rear window, by increasing the length of the mirror to thereby minimize shifting back and forth of the head of the operator. However, increasing the length of such rear vision mirrors, while retaining the necessary universality of adjustment for different operators, has resulted in a highly undesirable and irritating increase in the vibration of such enlarged mirrors. Rear vision mirrors, as well known, are almost invariably supported from the windshield or roof structure of the automobile by a bracket having a ball and socket, centered attachment to the mirror proper to readily permit proper adjustments for different operators, the mirror being retained in adjusted positions by the friction set up in the ball and socket joint. Increases in the length of such rear vision mirrors, so supported, however, result in greatly proportionally increased vibration with the result that such advantage of the wider field of vision is more than nullified by the excessive vibration, producing blurring.

One object of the present invention, therefore, is to provide simple and efficient novel means whereby the beneficial results of wide fields of vision of elongated rear vision mirrors may be obtained without the heretofore encountered detrimental vibrations thereof, such improved results being obtained by vibration-damping means effective between the mirror proper and the windshield of the vehicle.

Another object of the invention is to provide vibration-damping means of the type indicated which are utilized in conjunction with the usual universal adjustment mounting for the mirror whereby the damping elements are effective in all adjusted positions of the mirror.

Another object of the invention is to provide rear vision mirror vibration-damping means according to the two preceding paragraphs which are equally adaptable to either original mirror equipment of elongated type or accessory type elongated mirrors applied to and supported by original relatively short type mirrors.

Other objects of the invention are to provide vibration-damped rear vision mirror assemblies that are adaptable to windshields of different contours; which require no tools when adjusting the mirrors to different operative positions; are relatively inexpensive; and are neat in appearance.

Other objects of the invention will more clearly appear from the description and claims hereinafter following taken in connection with the drawings, wherein:

Fig. 1 is a perspective view showing the invention as applied to a rear vision mirror of original equipment in an automobile having a one-piece curved windshield, the view being from the outside looking through the windshield. Fig. 2 is a view looking up toward the mirror mounting of Fig. 1 and on the inside of the windshield. Figures 3 and 4 are detail sectional views, enlarged, corresponding approximately to the section lines 3—3 and 4—4, respectively, of Fig. 1. Fig. 5 is an elevational view illustrating the invention as applied to an accessory type of enlarged rear vision mirror detachably supported on a smaller original equipment mirror. Fig. 6 is an end elevation of the arrangement shown in Fig. 5. Fig. 7 is a vertical sectional view corresponding to section line 7—7 of Fig. 5. And Fig. 8 is a perspective of one of the elements employed in the modification of the invention illustrated in Fig. 5.

Referring now to that embodiment of the invention illustrated in Figures 1 to 4, broken away portions of the roof and windshield of a passenger type automobile are indicated at 10 and 11, respectively, the windshield 11 being of the modern one-piece, curved type as shown. Secured to a frame member 12 of the automobile is a mirror-supporting bracket 13 of conventional form. The rear vision mirror, considered in its entirety, is designated by the reference character A. The mirror A is of elongated type so as to obtain the benefits of a much wider field of vision than is available with the usual much shorter mirror such as shown at B in Fig. 5 and hereinafter referred to. As shown, the mirror A comprises a silvered or otherwise treated reflecting glass plate 14 of elongated, somewhat elliptical shape, secured in a sheet metal backing plate 15 with a preferably cushioning element 16 interposed between the silvered back and the backing plate. The mirror A is universally adjustably attached to the lower inturned end 17 of the bracket 13 by a friction tensioned, ball and socket joint 18 of usual construction.

As will be understood, the degree of friction set up in the universal joint must be such as to permit of ready or easy adjustment of the mirror to accommodate the line of vision of different operators.

As the length of the mirror is increased, so will the weight also be increased and these two factors greatly tend to accentuate the vibratory action of the mirror about its central pivotal or universal joint mounting on bracket 13 when the automobile is in motion and, particularly, at the higher speeds.

To eliminate or at least reduce to an acceptable and safe standard, such vibrations of the mirror, the following preferred means are employed. Two elongated, high grade spring steel wire arms or elements C—C are employed. Each element C, as shown, has a relatively short straight inner end section 20; a relatively long, somewhat curved section 21, the latter having secured thereto at its outer free end, a ball-like knob or bulb 22. The knobs or bulbs are preferably of synthetic, rubber-like composition or material to provide both a cushioning effect in contact with the windshield glass and also a frictional, non-slipping contact therewith. The straight inner ends 20 of elements C are detachably assembled with the mirror backing plate 15, preferably by sets of spaced loops 23—23 struck up from the plate as clearly shown in Fig. 4, the points of attachment being relatively quite distantly spaced from the universal joint of attachment on opposite sides thereof so that the spring damping effect is thereby augmented, the spring leverage action obviously increasing as the distance from the center of support increases. However, in order that the spring elements C may not be objectionable to look at from the interior of the car, the points of attachment to the mirror are preferably kept sufficiently inward of the mirror ends, that they are mostly concealed from the view of the car occupants.

As will be understood, the rear vision mirror is normally at an angle to the longitudinal axis of the car as best indicated in Fig. 2, so as to bring the plane of the mirror at right angles to the line of vision of the operator. Thus one end of the mirror is much farther from the windshield than the other, as is clear from Fig. 2. Also, to adapt the mirror to operators of different height, the mirror will necessarily assume various angular positions relative to the horizontal. With these factors in mind, it will be noted that the form of attachment between the elements C and the mirror are such as to permit angular adjustment of the elements C about an axis extending lengthwise of the mirror by reason of the rounded loops 23. As will be understood, the right-hand end of the mirror, as viewed by the operator, will be farther away from the windshield than the left-hand end. For this reason, the spring elements C—C may be made of somewhat different lengths with the right-hand one a little longer than the left-hand one, although this is not essential. It will also be evident that the two spring damper elements, when the mirror and elements C—C have been adjusted to the satisfaction of the operator, will automatically compensate for each other as the mirror tends to vibrate; that is, as the tension in one tends to lessen, the tension in the other will tend, correspondingly, to increase, thus maintaining the correct position of the mirror.

With the construction shown and described, it will be evident that the contacting or bearing ends 22 of the spring elements C can therefore be adjusted to frictionally engage the windshield in any and all adjusted positions of the mirror and, further, that this is true with respect to curved or divided flat windshields. Also, the entire adjustment of the elements C to their spring tensioned, frictional contact with the windshield is effected by hand, without necessity of any tools, as easily as the mirror itself is adjustable.

Referring now to the embodiment of the invention illustrated in Figs. 5 to 8. In these figures, B represents a common type of what may be termed a standard, small size rear-vision mirror universally adjustably supported by universal joint 118 such as found in most automobiles of the present time, said mirror B, in this embodiment of the invention, thus providing the adjustable supporting means for the accessory type rear view mirror, about to be described. Detachably mounted on mirror B is an elongated auxiliary or accessory rear vision mirror D, of which there are now a considerable number in use. The attachment is made by providing the enlarged auxiliary mirror with two spring plate clips 30—30 which slip down over the original mirror B and frictionally hold the two mirrors in assembled relation.

To obtain the benefits of the vibration dampers such as used in the first described form, advantage is taken of the clip curved bearing ends 31—31. Cooperable with each said curved bearing end 31 is a special, small, preferably casting E. Each said casting is formed with a flat bottom 32, an upper concaved face 33 adapted to conform to the underside of the curved section 31. Near one end, the member E is provided with an overhanging flange 34 conforming to the upper surface of the curved section 31. At its opposite end, member E has a threaded opening 35 for reception of wedge-headed screw 36 to engage over and thereby, in cooperation with flange 34, securely and non-rotatably attach the member E to clip 30.

Each member E is provided at its outside end with a pair of spaced, shallow flanges 37—37 and is additionally provided with two, longitudinally extending openings 38 and 39.

With the two clamping members E secured in place as shown and described, two spring wire dampers C'—C' are employed as in the case of the first described embodiment, each damper element C' having its short straight section 20 entered into opening 38 from the outer end of member E between flanges 37—37. A spring wire tie bar 40 is also preferably employed between the members E—E, the ends of said tie bar being entered into the remaining openings 39—39.

With the construction thus shown and described, it will be evident that the original and accessory mirrors B and D function as one, similar to mirror A and that the spring wire dampers C'—C', when attached as shown and described, function as in the form of invention shown in Figures 1–4. The tie bar 40, preferably somewhat bowed as shown and thus under some tension, serves to maintain the proper spacing of the cast members E and prevent twisting of the spring clips 30.

From the preceding description, it will be seen that the damping effects are obtained by means that involve only a relatively slight additional cost over that of the mirror proper, either original or accessory equipment. The detachable character of the spring elements C—C of the original equipment form, greatly facilitates the packaging and shipping of the assembly and the same is also true of the elements C'—C', castings E—E and tie bar 40 for the accessory type enlarged mirror.

There has herein been shown and described what is now considered the preferred manner of carrying out the invention. The same is merely illustrative, however, and all changes and variations are contemplated that come within the scope of the claims appended hereto.

What is claimed is:

1. A vibration damped rear vision mirror comprising: a mirror proper adapted to be adjustably supported in an automotive vehicle adjacent the windshield thereof, and a spring arm attached to said mirror proper at each side of the point of support thereof, said arms being attached to the mirror proper and extended outwardly towards the respective ends of the mirror proper and towards the windshield, said arms being of such length that, when the free ends thereof are in contact with the windshield, said arms are under tension in any adjusted position of the mirror proper and the tension in one arm opposes and counterbalances that in the other arm.

2. A rear vision mirror according to claim 1 wherein said arms are provided at their free ends with a friction-creating formation to prevent accidental slippage relative to the windshield.

3. As an article of manufacture, an accessory type, vibration damped rear vision mirror assembly adapted for cooperation with the windshield of an automotive vehicle, said assembly comprising: a relatively elongated rear vision mirror proper adapted for detachable mounting on a relatively smaller, rear vision mirror universally attached to the vehicle, said detachable mirror having clips spaced lengthwise thereof and located at opposite sides of and spaced from the universal point of attachment of said smaller mirror, for attachment to the latter; a pair of spring tensionable arms extending in opposite directions toward the ends of said detachable mirror; and means for detachably securing said arms to said clips of the detachable mirror when the latter is assembled with said smaller mirror.

References Cited in the file of this patent
UNITED STATES PATENTS

| | | |
|---|---|---|
| 736,714 | Gendron | Aug. 18, 1903 |
| 1,424,405 | Haughton | Aug. 1, 1922 |
| 1,694,833 | Shively | Dec. 11, 1928 |
| 1,910,864 | Szyminski | May 23, 1933 |
| 1,934,223 | Booth | Nov. 7, 1933 |
| 2,025,971 | Callowhill | Dec. 31, 1935 |
| 2,097,419 | Schmidt | Oct. 26, 1937 |
| 2,102,012 | La Hodny | Dec. 14, 1937 |
| 2,179,808 | Berg | Nov. 14, 1939 |
| 2,473,698 | Aves | June 21, 1949 |